(12) United States Patent
Kim et al.

(10) Patent No.: US 6,690,713 B1
(45) Date of Patent: Feb. 10, 2004

(54) TRACKING LOOP FOR A CODE DIVISION MULTIPLE ACCESS (CDMA) SYSTEM

(75) Inventors: Jaehyeong Kim, Pine Brook, NJ (US); Steven F Swanchara, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 541 days.

(21) Appl. No.: 09/596,589

(22) Filed: Jun. 19, 2000

(51) Int. Cl.$^7$ .............................................. H04B 1/707
(52) U.S. Cl. ...................................... 375/147; 375/149
(58) Field of Search ................................ 375/130, 150, 375/149, 145, 355, 147, 140; 370/342, 335, 441

(56) References Cited

U.S. PATENT DOCUMENTS 6,154,487 A * 11/2000 Murai et al. ................. 375/150
6,304,563 B1 * 10/2001 Blessent et al. ............. 370/335
6,333,947 B1 * 12/2001 van Heeswyk et al. ...... 375/148

* cited by examiner

*Primary Examiner*—Tesfaldet Bocure
(74) *Attorney, Agent, or Firm*—Eli Weiss; Ozer M. N. Teitelbaum

(57) ABSTRACT

A tracking circuit fine tunes the sampling time to a resolution of ⅛ Tc, where Tc is a chip duration after the searcher circuit finds the timing to within 0.5 Tc. Depending on the prior art tracking circuit that is being used, the input signals are early and late sampled PN despread pilot symbols or early, late and ontime sampled PN despread pilot symbols. Early and late samples are plus or minus one tick or Tt (one tick is ⅛ Tc) away from the ontime samples. The basic principle is that if early and late samples have about the same energy, then the timing is correct. If not, then the sampling time is changed to obtain a balance. In this invention, improved performance of the prior art tracking circuit is obtained by using pilot estimation results, not ontime pilot symbols. In one embodiment, pilot estimation results are low pass filtered signals of ontime symbols which are normally generated upstream of the tracking circuit.

11 Claims, 5 Drawing Sheets

TRACKING LOOP FOR A CODE DIVISION MULTIPLE ACCESS (CDMA) SYSTEM

BACKGROUND OF THE INVENTION

1. Field of the Invention

This invention relates generally to a class of equipment known as wireless terminals such as mobile devices; and, more specifically, to a method and apparatus for fine tuning the signal path to a pseudo-random number with a new improved tracking circuit in a Code Division Multiple Access (CDMA) wireless infrastructure.

2. Description of the Prior Art

The ever increasing availability and popularity of wireless communications can be linked to technological gains that have provided more efficient, reliable and cost-effective mobile devices, such as wireless digital telephones and personal communication systems. Due to their mobility and low power requirements, conventional mobile devices impose significant design constraints upon the wireless communication networks and, more particularly, the switching offices that support them.

Each switching office is associated with multiple transceiver sites, or cells, that enable communications between mobile devices and the switching office. Typically, there is a high density, or closeness, of cells per geographic area, often in a honeycomb pattern of overlapping cells of communication. Cell density causes each mobile device to always be close to at least one cell. Thus, a wireless signal may be concurrently heard by several cells and, possibly, several switching offices. Each cell generally covers a range of several miles in each direction which may, of course, be limited by natural or man-made objects such as mountains, buildings, etc.

In the past, wireless communications were largely analog based but, in recent years, the wireless carriers have moved toward digital based communications. This transition stems from compatibility and frequency utilization perspectives. If users can share a frequency or a range of frequencies, then more users can be accommodated on less bandwidth.

An increasingly popular wireless digital communication system is Code Division Multiple Access (CDMA), which uses spread spectrum technologies. For example, a transmitter transmits at a first frequency at a first time and at a second frequency at a second time, and a receiver is synchronized to switch frequencies during the reception of these frequencies in response to the change from the first to the second frequency.

Whenever multiple signals are communicated through a communication network, the potential for losing data or degradation of the communication signal may increase exponentially. Maintaining synchronization between a transmitter and a receiver is mandatory. If the synchronization or timing of the transmission or arrival of a signal is off, then the information content of the signal may be distorted or lost. This distortion or loss is commonly referred to as slippage.

Searching for and tracking a communication signal are two of the most important synchronization processes performed by the receiver. The searching process operates to find or locate possible signal paths in order to demodulate the strongest received communication signal as well as to provide candidates for a soft handoff.

The tracking process, in contrast, operates to track a received communication signal. This is often accomplished using a tracking circuit. Conventional tracking circuits work to fine tune the signal path, most often to a static pseudo-random number (PN) chip. In one prior art embodiment, the input signals of tracking circuits are early and late sampled PN despread pilot symbols. If the early and late samples have about the same energy, then the timing is considered to be correct. In another prior art embodiment, the input signals to the tracking circuit are early, late and ontime sampled PN despread pilot symbols signals. The product of the ontime pilot symbol with the difference of the early and late sampled PN despread pilot symbols are used as an error signal to fine tune the sampling time. What is needed is a new improved method for tracking a received signal.

SUMMARY OF THE INVENTION

A tracking circuit fine tunes the sampling time to a resolution of $1/16$, $1/4$ or $1/8$ of Tc, depending on the circuit design. In the embodiment disclosed the sampling time is $1/8$ Tc, where Tc is a chip duration after the searcher circuit finds the timing to within 0.5 Tc. Depending on the prior art tracking circuit that is being used, the input signals are early and late sampled PN despread pilot symbols or early, late and ontime sampled PN despread pilot symbols. Early and late samples are plus or minus one tick or Tt (one tick is $1/8$ Tc) away from the ontime samples. The basic principle is that if early and late samples have about the same energy, then the timing is correct. If not, then the sampling time is changed to obtain a balance. In this invention, improved performance over the prior art tracking circuit is obtained by using pilot estimation results instead of the actual ontime pilot symbol signals. In one embodiment, pilot estimation results are low pass filtered signals of ontime symbol signals which are normally generated upstream of the tracking circuit. Thus, with this invention, additional structure is not required to obtain improved tracking results.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. While the present invention is embodied in hardware, alternate equivalent embodiments may employ, whether in whole or in part, firmware and software. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which like numbers designate like objects, and in which.

DETAILED DESCRIPTION

Figure 1:
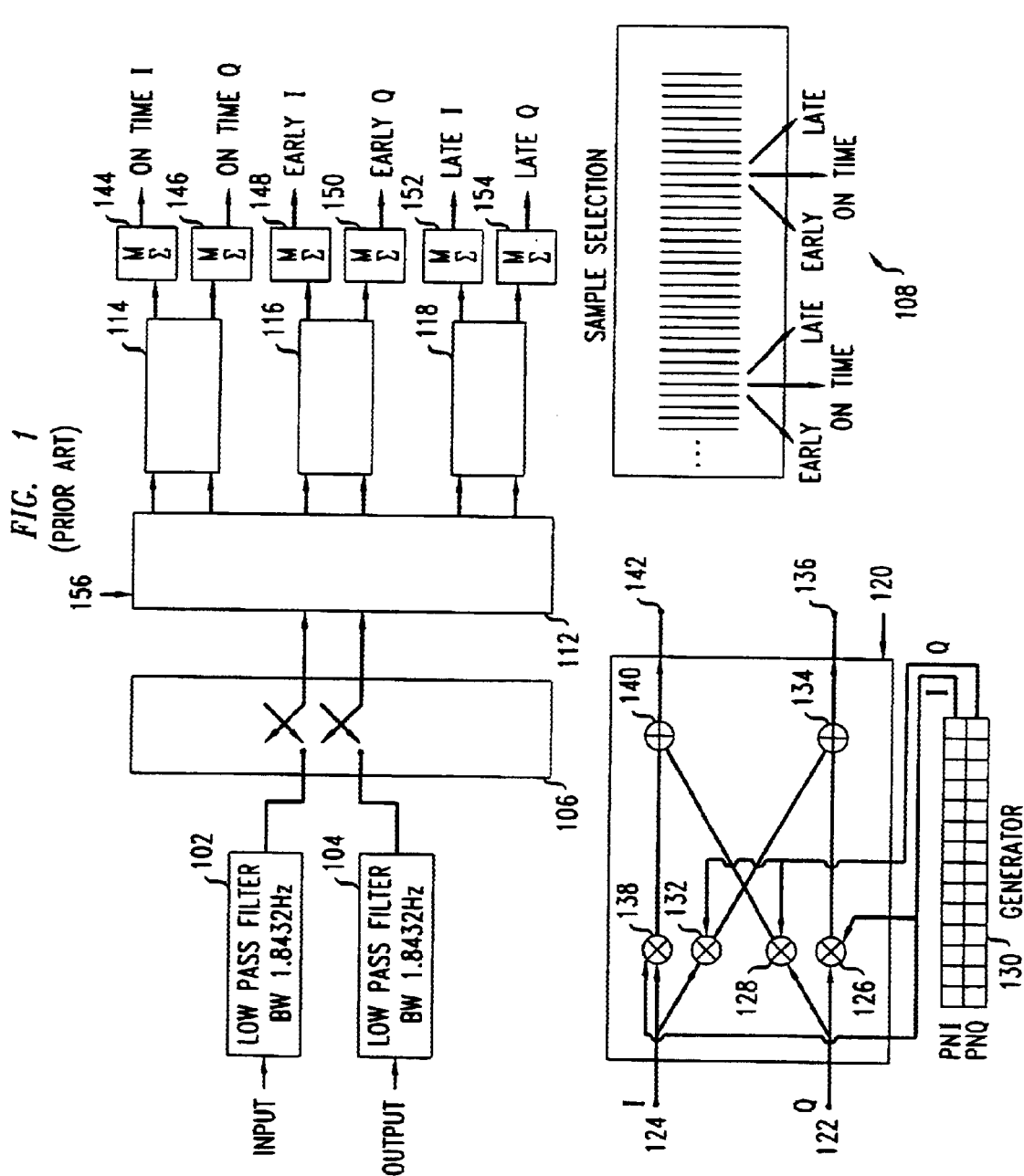
FIG. 1 is a block diagram of an exemplary prior art circuit for pre-processing signals going to a tracking circuit.

Referring to FIG. 1, there is disclosed a block diagram of an exemplary prior art circuit 100 for pre-processing signals going to a tracking circuit. A digital low pass filter 102 is coupled to receive the in-phase (or real) (I) portion of a digital communication signal and a digital low pass filter 104 is coupled to receive the quadrature-phase (or imaginary) (Q) portion of a digital communication signal. The output of analog low pass filters 102 and 104 are directed to a sampler 106 which samples the received real and imaginary signals at a rate of 29.4912 Hz or 8 samples per chip. The sampler 106 samples the received signals to produce a sequence of late, ontime and early spread spectrum channel signal samples (see box 108 of FIG. 1). These signals are directed to a sampler selection circuit 112. The sampler selection circuit also receives a control signal from a tracking circuit 200 of FIG. 2. Sampler selection circuit 112 separates the ontime signals, the early signals and the late signals from each other and directs the ontime signals to multiplier circuit 114, the early signals to multiplier circuit 116 and the late signals to multiplier circuit 118. Multiplier circuits 114, 116, 118 are each similar in structure and are illustrated in more detail in box 120 of FIG. 1. The ontime, early or late real (I) portion of a signal is received at one input terminal 124 and the ontime, early or late imaginary (Q) portion of that signal is received at input terminal 122. The imaginary portion of the signal is split into two parts, a first part being directed to multiplier 126 where it is multiplied with the real portion of a pseudorandom number (PN) signal from a PN generator 130. The real portion of the signal applied to input terminal 124 is split into two parts, one part being directed to a multiplier 132 circuit where it is multiplied with the imaginary portion of the PN signal form a generator 130. The output signal of multiplier 126 is directed to adder 134 where it is subtracted from the signal from multiplier 132. The output of multiplier 134 is directed to output terminal 136 which is the imaginary portion of the signal. Returning to input terminal 124, the real portion of the signal is directed to multiplier circuit 138 where it is multiplied with the real portion of the PN signal from generator 130. The output signal of multiplier 138 is added with the signal from multiplier 128 in adder circuit 140, the output of which is directed to output terminal 142. The signal on output terminal 142 is the real signal.

The real and imaginary or "complex" signals where complex refers to both real and imaginary signals from multiplier circuits 114, 116 and 118 are directed to accumulate and dump circuits 144–154. Accumulate and dump circuits 144 and 146 are connected to receive and pass ontime complex signals. Accumulate and dump circuits 148 and 150 are connected to receive and pass early complex signals, and accumulate and dump circuits 152 and 154 are connected to receive and pass late complex signals. Accumulate and dump circuits accumulate M samples where the value of M is dependent in part on the velocity of the moving mobile device and the chip rate. The value of M is discussed below in more detail.

Figure 2:
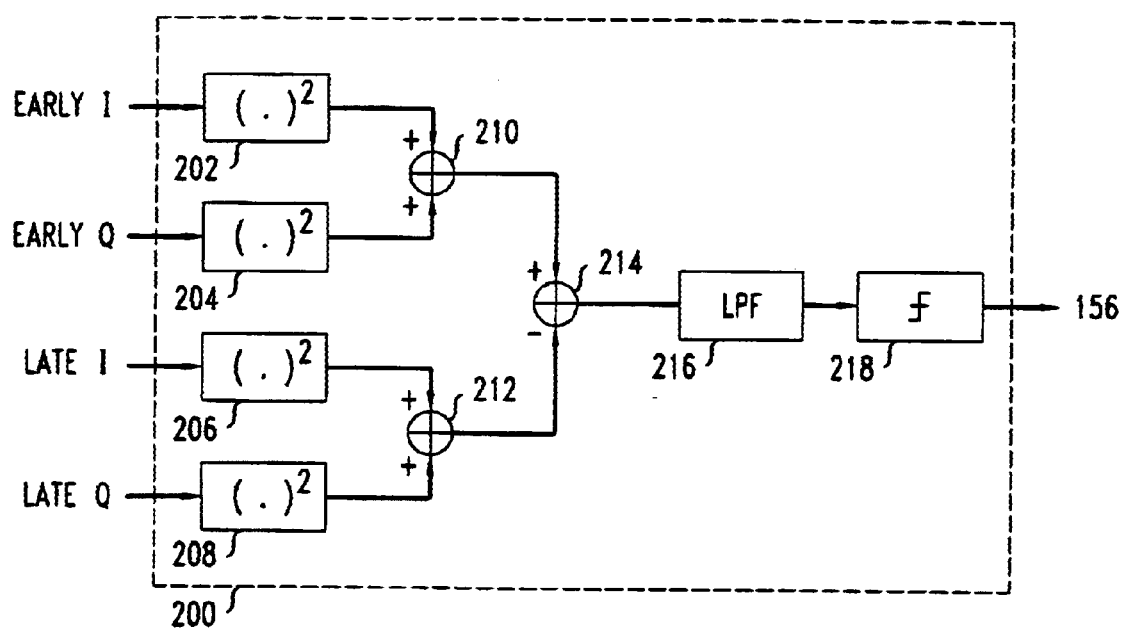
FIG. 2 is a block diagram of an exemplary prior art delay locked loop tracking circuit.

Referring to FIG. 2, there is disclosed a prior art tracking circuit identified as a Delay Lock Loop (DLL) tracking circuit. The DLL tracking circuit is connected to receive, as input signals, early real signals and imaginary signals, and late real signals and late imaginary signals from the pre-processing circuit of FIG. 1. More specifically, the early real (I) signal from the pre-processing circuit of FIG. 1 is directed to squaring circuit 202 which provides an early real (I) power signal ($EI^2$). The early imaginary (Q) signal from the pre-processing circuit is directed to squaring circuit 204 which provides an early imaginary (Q) power signal ($EQ^2$). The output signals from squaring circuits 202 and 204 are directed to adder circuit 210 where they are added together to generate an early power signal.

In a similar manner, the late real (I) signals from the pre-processing circuit of FIG. 1 are directed to squaring circuit 206 which provides a late real (I) power signal ($LI^2$), and a late imaginary (Q) signal from the pre-processing circuit is directed to circuit 208 where the received signal is squared to provide a late imaginary (Q) power signal ($LQ^2$). The signals from squaring circuits 206 and 208 are directed to adder 210 where they are combined to generate a late power signal.

The early power signals from adder 210 and the late power signals from adder 212 are the inputs to adder 214. Adder circuit 214 combines the early and late power signals to generate a timing error output signal having an amplitude that is proportional to the difference of the early and late power signal amplitudes. The timing error signal from 214 is the input signal to low pass filter 216 which is an accumulate and dump circuit. The output of the low pass filter 216 is directed to threshold circuit 218 which generates a sample time adjustment signal that is directed to input terminal 156 of pre-processing circuit 112 of FIG. 1. The sample time adjustment signal operates to cause the difference between the early and late complex signals to approach 0.

Figure 3:
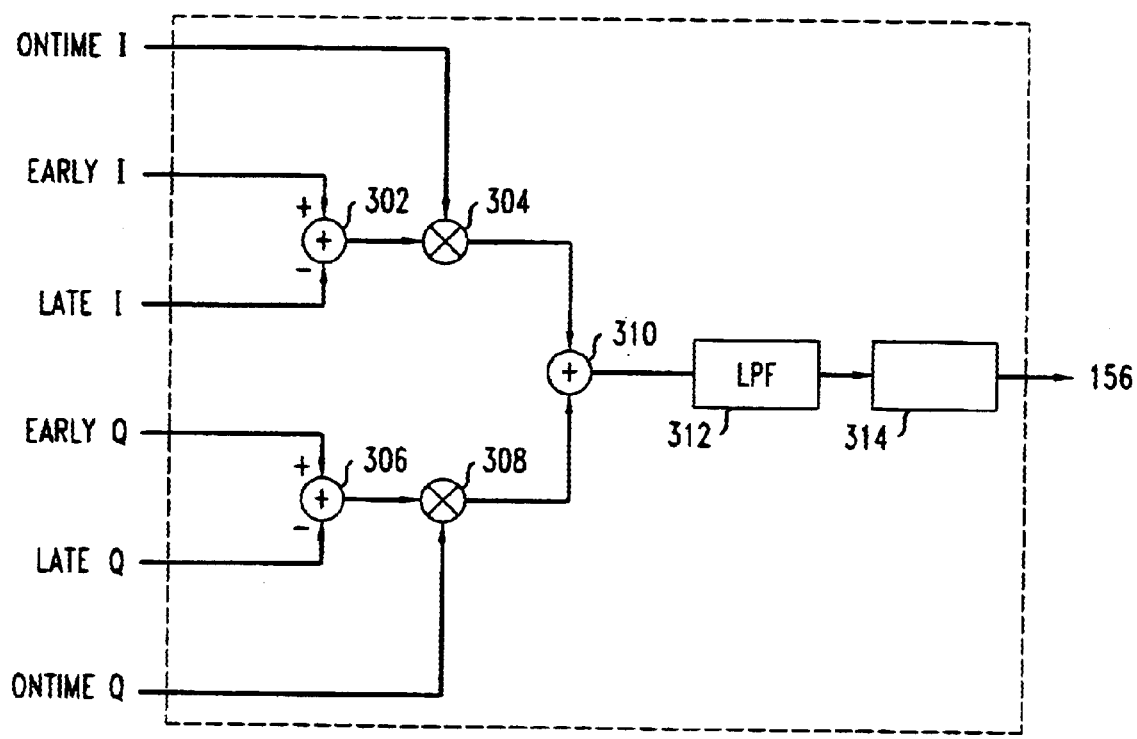
FIG. 3 is a block diagram of an exemplary prior art modified delay lock loop tracking circuit.

Referring to FIG. 3, there is disclosed a prior art tracking circuit identified as a Modified Delay Lock Loop (MDLL) tracking circuit. This tracking circuit is connected to receive early complex and early real signals, late complex and late real signals arid ontime complex and ontime real input signals from the pre-processing circuit of FIG. 1. The basic difference between the tracking circuit of FIG. 2 and that of FIG. 3 is that the tracking circuit of FIG. 3 is adapted to receive ontime complex input signals. Adder 302 is connected to receive early and late real signals from the pre-processing circuit of FIG. 1 and subtract the late real signals from the early real signals. The output signal of adder 302 is multiplied by the ontime real signal in multiplier 304. Early and late imaginary signals from the pre-processing circuit of FIG. 1 are directed to adder 306 where the late imaginary signals are subtracted from the early imaginary signals. The output signal of adder 306 is multiplied by the ontime imaginary signal from the pre-processing circuit in multiplier 308. The output signals of adders 304 and 308 are combined in adder 310 and the result is directed to low pass filter 312. The output signal of low pass filter 312 is directed to threshold circuit 314 which generates an error signal that is greater or less than a fixed threshold value. The error signal is the sample time adjustment signal that is directed to input terminal 156 of sampler 112 of FIG. 1 and is used to adjust the sample time. The error signal controls the phase of the locally generated signal to cause the difference between the early and late signals to approach 0.

The prior art tracking circuits of FIG. 2 and FIG. 3 fine tunes the sampling time to within an eighth of a chip duration after a searcher circuit has found the timing within a half of a chip symbol duration. With the Delay Lock Loop (DLL) tracking circuit, the inputs are early and late samples of the PN despread pilot symbols. If the early and late samples have about the same energy, then the timing is correct. If not, then the sampling time is changed until a balance is obtained. The Modified Delay Lock Loop (MDLL) circuit of FIG. 3 uses the product of ontime pilot symbols together with the difference of early and late symbols for the decision variable or sample time adjustment signal.

In this invention, estimated ontime symbol signals are used to obtain the sample time adjustment signal, not actual ontime symbol signals as disclosed and used by the prior art circuits of FIG. 3.

Figure 4:
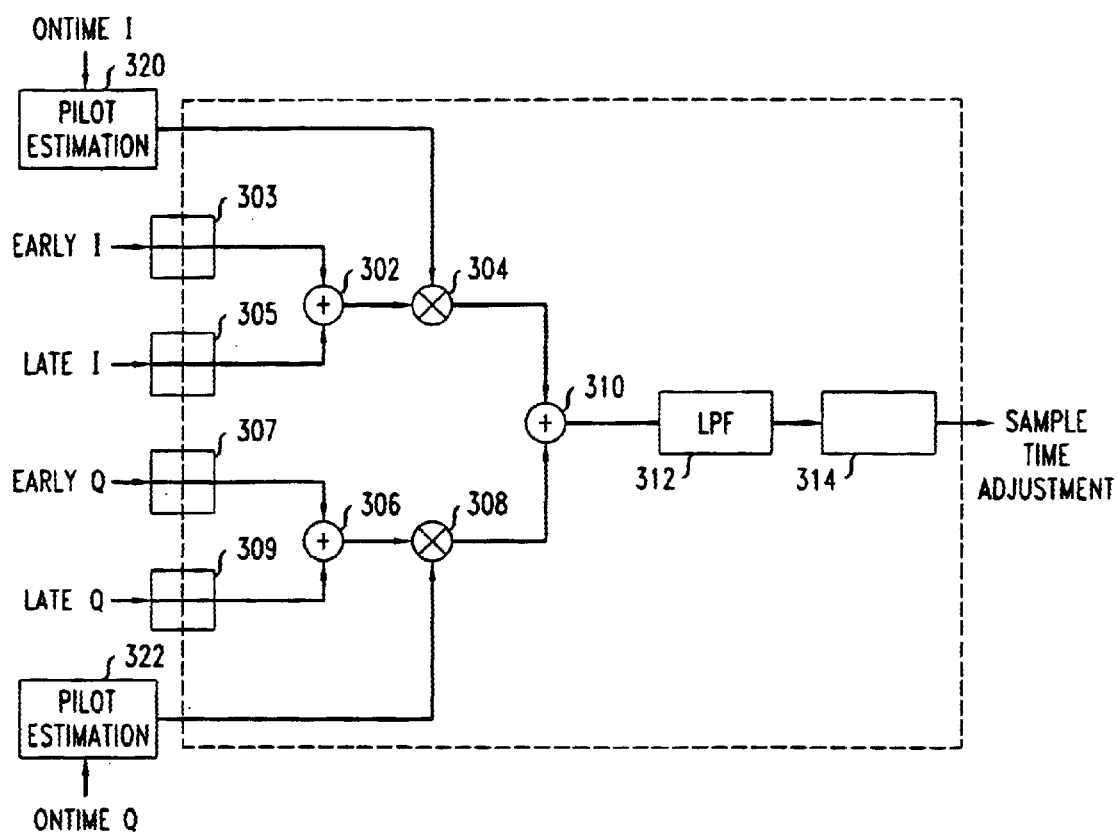
FIG. 4 is a block diagram of the preferred embodiment of the invention.

Estimated ontime symbol signals are ontime complex signals and ontime real signals obtained from a low pass filter. Referring to FIG. 4, there is illustrated a tracking circuit in accordance with the principles of the invention. In FIG. 4 a pilot estimation circuit generates ontime real signals and ontime imaginary signals. More specifically, the ontime real signal from accumulator and dump circuit 144 of FIG. 1 is directed to pilot signal estimation circuit 320. Pilot estimation circuit 320 can be a sliding window filter such as a low pass filter which receives and accumulates a specific number of pilot symbols and obtains a moving average of the signals accumulated. In the embodiment disclosed circuit 320 accumulates seven chip signals and generates a signal that is an average of the seven chip signals received. Upon receipt of the seventh chip signal, an average signal of the last seven chip signals received is generated and directed to the multiplier 304. Early and late real signals from the accumulate and dump circuits 148, 152 of FIG. 1 are each delayed in delay circuits 303, 305 and then added in adder 302, the resultant being multiplied with the signal from the sliding window filter in multiplier 304. The delay circuits 303, 305 provide a delay that is equal to the delay present in the sliding window filter 320. In a similar manner, an ontime imaginary signal from accumulator and dump circuit 146 of FIG. 1 is directed to pilot signal estimation circuit 322. Pilot estimation circuit 322 can be a sliding window filter such as a low pass filter which receives and accumulates a specific number of pilot symbols, for example seven and, upon receipt of the seventh signal, generates a signal that is the moving average of the last seven signals received. The signal generated by pilot estimation circuit 322 is directed to multiplier 308. Early and late imaginary signals from accumulate and dump circuits 150, 154 of FIG. 1 are each delayed in delay circuits 307, 309 and then combined in adder 306, the resultant being multiplied with the signal from the sliding window filter in multiplier 308. The delay circuits 307, 309 provide a delay signal to the delay present in the sliding window filter 322.

The output signals from multipliers 304, 308 are combined in adder 310, the output of which is directed to low pass filter 312. Adder 310 generates a timing error output signal having an amplitude that is proportional to the difference of the signals from multiplier 304, 308. The timing error signal from adder 310 is the input signal to low pass filter 312 which is an accumulate and dump circuit. The output of low pass filter 312 is directed to threshold circuit 314 which generates a sample time adjustment signal that is directed to input terminal 156 of the pre-processing circuit 112 of FIG. 1. The sample time adjustment signal from circuit 314 operates to cause the difference between the signal from multipliers 304, 308 to approach zero.

The tracking circuits of FIGS. 2 and 3 fine tune the sampling time after a search circuit (also referred to as a "searcher") finds the timing to within 0.5 Tc, where Tc is a chip duration. The search circuit (not illustrated) and the tracking circuit use pilot signals as input signals. In the embodiment here disclosed, it is assumed that there are eight samples per chip. However, it is to be understood that the number of samples per chip can be four or 16 or some other value depending upon the requirements or parameters of the system being utilized. With eight samples per chip, the resolution is ⅛ Tc. The preprocessing circuit of FIG. 1 generates the input signals for the tracking circuits of FIGS. 2 and 3. Referring to FIG. 1, the sampler 106 generates eight sampling input signals per chip. Since the search circuit provides timing signals that are within 0.5 Tc, the location of ontime samples can be selected from four samples. Early and late samples are ± one tick or Tt (one tick being ⅛ Tc) away from the ontime samples (see box 108). If the early samples and the late samples have about the same energy, then the timing is correct. If the energy levels are different, then the sampling time is changed until a balance is obtained. Three streams of input signals (late signals, early signals and ontime signals) are combined in a complex pseudo-random number (PN) despreading process by a complex multiplication by PN sequence and M sample accumulations. The complex PN despreading process increases the Signal-to-Noise Ratio (SNR) by M and, at the same time, reduces the output data rate by the same amount. The value of M should not be arbitrarily large. The channel variation within the time duration corresponds to M times the chip duration should be small to avoid degradation of the information in the channel. In addition, the value of M is dependent in part on the velocity of the mobile device.

For optimum results, the value of M can be represented as:

$$T_M \approx \frac{1}{20 \cdot f_D} \quad (1)$$

where $f_D$ is the maximum Doppler frequency and $T_M$ is the accumulation time duration.

The value of 20 comes from the observation that variations of sinusoidal signals within 0.05 of their periods are acceptably small.

Continuing:

$$f_D = \frac{V \cdot f_c}{c} \quad (2)$$

where V is the velocity of the mobile device, for example a mobile telephone in a moving car, $f_C$ is the carrier frequency, and c is the speed of light.

Combining relationships 1 and 2:

$$T_M \leq \frac{c}{20 \cdot v \cdot f_c} \quad (3)$$

Now, if $R_{chip}$ is the chip rate in the CDMA system, then $$M = R_{chip} \cdot T_M \leq \frac{c \cdot R_{chip}}{20 \cdot v \cdot f_c} \quad (4)$$

In one embodiment, the following applies:
The carrier frequency is 1.9 GHz ($f_C$=1.9×10⁹), the speed of light is 3×10⁸ m/sec, $R_{chip}$ is 3.6864×10⁶ chips/sec, and the velocity of the mobile device is 100 Km/h (V=27.8 m/sec).

Insertion of the above parameters into relationship 4 obtains a value M of approximately 1046.

In a preferred embodiment, M can be set to be 1124 because it matches the system clock where 1124 is a quarter of a power control group.

The term "pilot symbol" is defined as the output of the pseudo-random number (PN) despreading process. Depending on the sample timing (early, late, ontime) there are three kinds of pilot symbols which are input signals to the tracking circuit.

As noted previously, there are two existing tracking methods. Delay Lock Loop (DLL) as illustrated in FIG. 2, and Modified Delay Lock Loop (MDLL) as illustrated in FIG. 3. The input signals of the DLL circuit are early and late pilot symbols. The low pass filter of FIG. 2 is actually a weighted integration and dump circuit. The output rate of the circuit of FIG. 2 is the sample time update rate which is once each several milliseconds. The MDLL circuit of FIG. 3 requires ontime pilot symbol signals in addition to early and late symbol signals. The decision variable is the product of the ontime pilot symbol signal and the difference of early and late pilot symbol signals. A coherent demodulation system should have good pilot signal estimation. However, ontime pilot symbol signals do not have enough Signal-to-Noise Ratio (SNR) because the input chip SNR is about −30 dB and, in our example, the pilot symbol SNR is about 0 dB.

Figure 5:
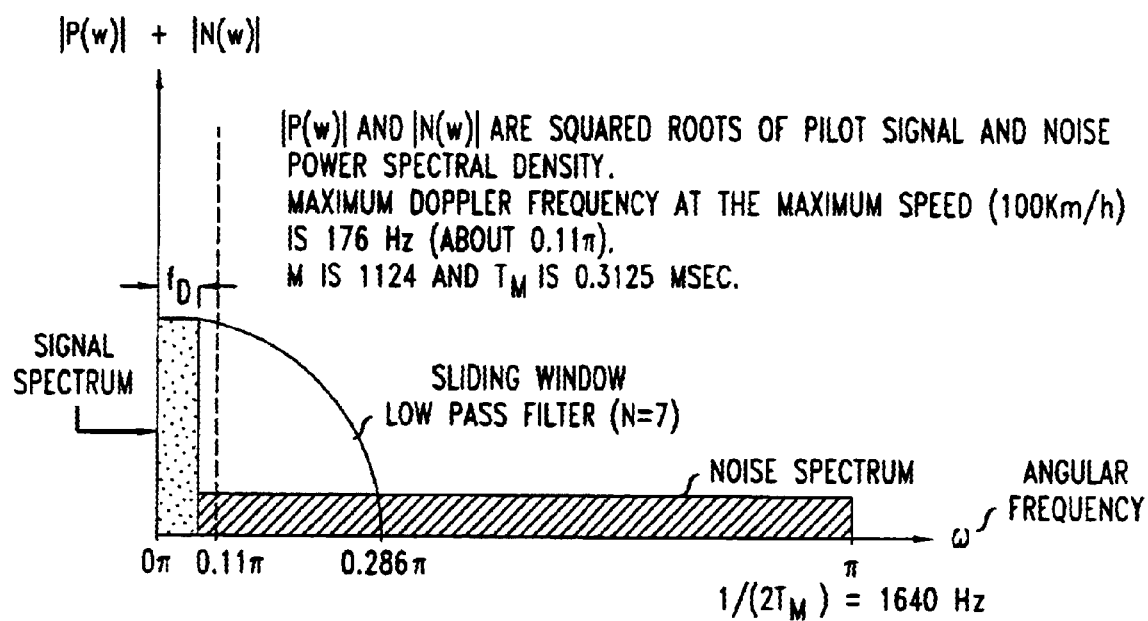
FIG. 5 is a frequency domain illustration of pilot symbol and noise after complex pseudo-random noise despreading.

Referring to FIG. 5, there is illustrated the frequency domain of the pilot symbol and noise after complex pseudo-random noise despreading. It is to be noted that the channel information, the signal spectrum, is within 10 percent of the full frequency domain. The noise power can be reduced by about 90 percent by using a low pass filter having a bandwidth of 0.11 π. Pilot estimation is the process of increasing the pilot symbol SNR by eliminating the noise that is outside signal band. There are various ways of obtaining pilot estimation. One solution is by sliding window filtering which averages over a time window defined by the relationship:

$$y[n-T_D] = \sum_{k=n}^{N-1} a \cdot x(n-k)$$

where a is the filter coefficients of N-tap Finite Impulse Response (FIR) filter, $T_D$ is the delay due to filtering which is $$\frac{N}{2},$$

x(n) is the ontime pilot symbol and y(n) is the pilot symbol signal estimation output.

In the embodiment here disclosed, N is assigned the value of 7 and the stop band edge or angular frequency cutoff of the sliding window low pass filter is set at 0.286 π. If a sharp edge filter or a step function filter is used, the stop band edge angular frequency cutoff can be reduced to near 0.11 π to effectively reduce additional noise power. Optimum results can be obtained if the unknown parameters are dynamically estimated by adaptive filtering processing.

The value of N, $a_k$, and $T_D$ can be changed adaptively or they can be fixed based on the performance and implementation complexity.

Referring further to FIG. 5, |P(w)| and |N(w)| are squared roots of pilot signal and noise signal power spectrum density. For a mobile device moving at a maximum velocity of 100 K/h, the maximum doppler frequency is 176 Hz or about 0.11 π. In this instance, M will be 1124 and $T_M$ will be 0.3125 mSec.

In this invention, there is disclosed a new improved tracking circuit which provides improved performance by using signals that are estimations of ontime pilot signal results instead of actual ontime pilot symbol signals.

While there has been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

The invention claimed is:

1. A method of generating a signal for fine tuning the tracking of a communication signal in a wireless infrastructure comprising the steps of:
   combining an early real PN despread pilot symbol signal with a late real PN despread pilot symbol signal to obtain a first difference signal;
   combining an early imaginary PN despread pilot symbol signal with a late imaginary PN despread pilot symbol signal to obtain a second difference signal;
   generating an estimated ontime real PN despread pilot symbol signal;
   multiplying the first difference signal with the estimated ontime real PN despread pilot symbol signal to obtain a first sum signal;
   generating an estimated ontime imaginary PN despread pilot symbol signal;
   multiplying the second difference signal with the estimated ontime imaginary PN despread pilot symbol signal to obtain a second sum signal; and
   adding the first sum signal to the second sum signal to obtain a tracking signal.

2. The method of generating the estimated ontime real and imaginary PN despread pilot symbol signals of claim 1 comprising the steps of:
   filtering an ontime real PN despread pilot symbol signal to increase the signal-to-noise ratio by reducing the noise that is outside the filter band; and
   filtering an ontime imaginary PN despread pilot symbol signal to increase the signal-to-noise ratio by reducing the noise that is outside the filter band.

3. The method of claim 2, wherein the filtering of the estimated ontime real and imaginary PN despread pilot symbol signals is by low pass filters.

4. The method of claim 2, wherein the filtering of the estimated ontime real and imaginary PN despread pilot symbol signals is by sliding window filters.

5. The method of claim 3, wherein the low pass filters reduce up to 90 percent of the noise in the despread signal.

6. The method of claim 5, wherein the low pass filter has an angular frequency bandwidth of 0.11 p.

7. The method of claim 1, wherein each estimated ontime real and ontime imaginary PN despread pilot symbol signal is the average of M sample accumulations, where M is less than the speed of light times the chip rate divided by twenty times the carrier frequency times the velocity of the mobile device.

8. The method of claim 7, wherein M is a number obtained by multiplying the speed of light by the chip rate and dividing the result by the velocity of the mobile device times a number less than twenty-five.

9. The method of claim 7, wherein M sample accumulations is set to be 1124.

10. The method of claim 1, further comprising the steps of:
    averaging seven consecutive ontime real pilot symbol signals to generate the estimated ontime real pilot symbol signals; and
    averaging seven consecutive ontime imaginary pilot symbol signals to generate the estimated ontime imaginary pilot symbol signal.

11. The method of generating a signal for fine tuning the tracking of a communication signal in a wireless infrastructure of claim 1, further comprising the steps of:
    delaying the early real PN despread pilot symbol signal and the late real PN despread pilot symbol signal prior to being combined by an interval of time equal to the delay that is present in the estimated ontime real PN despread pilot symbol signal; and
    delaying the early imaginary PN despread pilot symbol signal and the late imaginary PN despread pilot symbol signal prior to being combined by an interval of time equal to the delay present in the estimated ontime imaginary PN despread pilot symbol signal.

* * * * *